United States Patent [19]

Salmon

[11] 3,906,325

[45] Sept. 16, 1975

[54] ADAPTIVE FEELING APPARATUS FOR DETERMINING A PREARRANGED POSITION IN WHICH A PART IS TO BE FITTED

[75] Inventor: Marion Salmon, Ivrea (Turin), Italy

[73] Assignee: Ing. C. Olivetti & C., S.p.A., Ivrea (Turin), Italy

[22] Filed: Dec. 20, 1973

[21] Appl. No.: 426,482

[52] U.S. Cl. ............... 318/569; 318/488; 318/646; 318/653
[51] Int. Cl.² ......................................... G05B 19/18
[58] Field of Search .......... 318/567, 646, 569, 488, 318/653, 561

[56] References Cited
UNITED STATES PATENTS

| | | | |
|---|---|---|---|
| 3,526,903 | 9/1970 | Brenner et al. | 318/561 |
| 3,754,487 | 8/1973 | Nachtigal | 318/561 |
| 3,809,488 | 5/1974 | Sondcregger | 318/646 X |

Primary Examiner—B. Dobeck
Attorney, Agent, or Firm—Schuyler, Birch, Swindler, McKie & Beckett

[57] ABSTRACT

An adaptive feeling apparatus for searching and determining a prearranged position on a structure comprises an element movable in accordance with a predetermined programme recorded on an information support.

The movable element comprises a device for gripping a part to be transported to the prearranged position.

Control means are provided for producing the advance of said movable element until the part contacts the structure and for producing a random movement of the element for searching for the prearranged position.

Means are provided for modifying the movement of the element in accordance with the variable force acting between the structure and the part until the prearranged position is achieved.

14 Claims, 2 Drawing Figures

3,906,325

ADAPTIVE FEELING APPARATUS FOR DETERMINING A PREARRANGED POSITION IN WHICH A PART IS TO BE FITTED

BACKGROUND OF THE INVENTION

1. Field of the Invention

The present invention relates to an adaptive feeling apparatus for searching for and determining a prearranged position on a structure, comprising at least one element movable in accordance with a predetermined programme recorded on an information support.

2. Description of the Prior Art

There are known from the prior art numerically controlled assembly arrangements equipped with gripping devices, such as for example pincers, capable of moving with various degrees of freedom in accordance with a predetermined programme recorded on an information support, for example punched tape, magnetic tape or disc, etc.

Experience shows that such apparatus is of limited practical application. In fact, the sum of the tolerances of the apparatus and of the parts to be assembled or fitted is generally such as to render assembly or fitting almost always impossible.

To render such apparatus usable practically speaking, it is necessary to endow the same with some sensitivity which will enable these arrangements to modify their inherent operation so as to adapt themselves to real situations which may differ from those programmed.

Numerous experimental tests moreover confirm the theory that fitting operations can be reduced to a sequence of insertion operations.

A fundamental technical problem to be solved in order to produce assembly apparatus therefore consists in determining the position of the hole in which the part to be fitted is to be inserted.

One known apparatus advances the part to be fitted by causing it to slide on the surface in which the hole is arranged and, in order to determine the position of the hole, analyzes qualitatively the components parallel to the said surface of the force which is exerted between the surface itself and the part. These components are measured on the structure in which the part is being fitted.

The aforesaid known apparatus lends itself well to the operation of searching for the hole only if this has a lead-in, for example a countersink or flare, and the part to be fitted has already reached the lead-in. Moreover, the said apparatus requires the checking and quantitative analysis of at least two forces. Finally, this apparatus is not adapted to search for the surface in which the hole is located, inasmuch as it is assumed that the part will begin the search for the hole starting from a position in which it is already in contact with the said surface. SUMMARY OF THE INVENTION The aforesaid disadvantages are obviated by the adaptive feeling apparatus for determining a prearranged position on a surface of a structure which comprises one element movable in accordance with a predetermined path recorded on an information support and for sensing the surface of the structure and control means for controlling the movement of the element producing in a first stage the advance of the movable element against the surface to determine the plane in which the prearranged position is located and for producing in a second stage the advance of the movable element in the plane in a predetermined random search movement to determine the prearranged position.

Further are provided means for detecting the contact acting between the movable element and the plane and means responsive to the detecting means for modifying the movement of the element during the sensing operation.

Another characteristic of the apparatus of the invention consists in that the said movable element comprises at least one device for gripping a part in order to transport it to the said prearranged position and means for actuating the said device so as to fit the said part to the said structure.

DESCRIPTION OF THE PREFERRED EMBODIMENT

Figure 1:
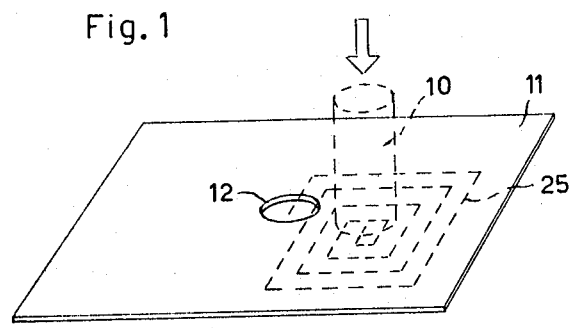
FIG. 1 is a diagram illustrating the principle of the invention.

FIG. 1 is a diagram illustrating the principle of the apparatus according to the invention. A cylindrical part 10 is disposed at a certain distance from a surface 11 having a hole 12 into which the part 10 must be inserted. This part is movable through the medium of a set of motors (not shown in FIG. 1) controlled by a control unit 16 in accordance with a programme recorded in a suitable memory, for example on punched tape or another suitable support.

The control unit 16 is connected through two lines to a comparator circuit 19 connected to an assembly of transducers 20 connected in turn to the part 10. The transducer assembly 20 can send to the circuit 19 signals of a value porportional to the mechanical force possibly transmitted to the part 10 by the surface 11.

According to the invention, the apparatus employs analysis of the forces transmitted to the part to be fitted by the structure on which it must be positioned. More particularly, of these forces it examines the single component F parallel to the insertion movement.

The operation of insertion of the part 10 in the hole 12 is performed in two successive stages, in the first of which the search for and determination of the plane of the hole 12 is effected, while in the second stage the search in this same plane, or on this same surface, for the same hole 12 in which the part is to be inserted is effected.

To carry out the first stage, the control unit 16 causes the part 10 to advance in the direction of the axis of the hole 12 (shown in FIG. 1 by an arrow). The control unit 16 moreover enables the circuit 19 to compare the force F with a predetermined comparison force P recorded on the tape. The comparison force P is chosen of a value such as to ensure that when the force F exceeds it the part is in contact with the surface 11. The force F and the force P are input to the circuit 19 by the transducers 20 and the said control unit 16, respectively. The fact that the force F attains the force P in value indicates an impact of the part 10 against the surface 11, irrespective of the fact that its real position coincides with that laid down. The position of the part 10 when it has struck against the surface 11 is indicated in FIG. 1 in dashed lines. This occurrence is detected by the circuit 19, which sends a signal to the control unit 16, so that the latter arrests the advance of the part 10 in the above-mentioned direction and at the same time causes the part 10 to advance in a plane random search movement to identify the hole 12. In this movement, the end of the part 10 in contact with the surface 11 describes any predetermined path whatsoever, for example a spiral, of suitably small pitch, which is indicated by the dashed line 25 in FIG. 1. The aforesaid path may also be a key pattern or another suitable path. During the said spiral movement, the force F picked up by the transducers 20 is compared by the circuit 19 with a predetermined force Q recorded on the tape. The comparison force Q is chosen of a value such as to ensure that when the force F becomes less than Q the part 10 is no longer in contact with the surface 11 and therefore is in correspondence with the hole 12.

The control unit 16 then stops the random search movement and causes the part 10 to advance in the direction of the axis of the hole 12 again in order to insert it therein.

Figure 2:
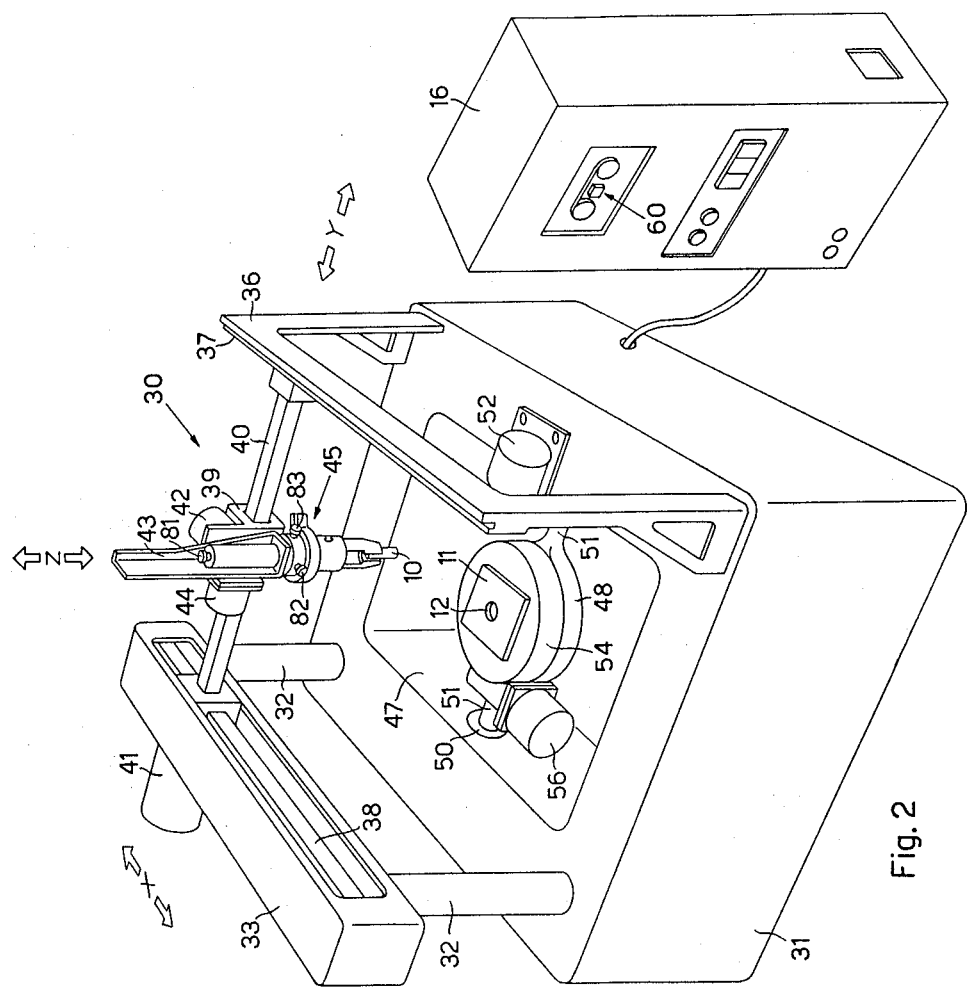
FIG. 2 is a perspective view of the apparatus of the invention.

An embodiment of the apparatus of the invention in accordance with the principle explained hereinbefore is shown in FIG. 2 and indicated generally by the reference 30. A casing 31 supports on one side a pair of columns 32, on which there is fixed a crosspiece 33, and on the other side a frame 36 provided with a horizontal guide 37 at the top. Inside the crosspiece 33 there is arranged a horizontal guide 38 parallel to the guide 37. A horizontal bridge 40 is disposed perpendicular to the guides 37 and 38, on which it is supported by its ends to slide thereon in the direction indicated by the arrows X through the agency of a motor 41. Arranged slidably on the bridge 40 is a slide 39 which is movable along the bridge 40 itself by means of a motor 42. The direction of movement of the slide 39 is therefore perpendicular to the direction indicated by the arrows X and is indicated by arrows Y in FIG. 1. A slide 43 is slidable on the slide 39 by means of a motor 44 in a direction perpendicular to the directions X and Y and supports an arm 45. The direction of movement of the slide 43 is indicated by arrows Z in FIG. 2.

The casing 31 is provided with a cavity 47 over which there is arranged a table 48 supported rotatably by the two sides of the cavity 47, for example by means of the bushes 50 (FIG. 2 shows only thereof) in which there are inserted diametral pins 51 integral with the table 48 itself and parallel to the direction Y. A motor 52 fixed to the casing 31 is adapted to turn the table 48 about the axis of the pins 51, which is horizontal and parallel to the axis Y. On the table 48 there is arranged a second table 54 rotatable about an axis perpendicular to the axis of the pins 51 by means of a motor 56 fixed to the table 48. Fixed to the table 54 is the structure to which the part 10 is being fitted, for example the above-mentioned surface 11. The motors 41, 42, 44, 51 and 56 are of the step-by-step type, but may be of any other suitable type, for example d.c. electric motors. The apparatus of the invention moreover comprises the control unit 16 and a punched tape reader 60.

Figure 3:
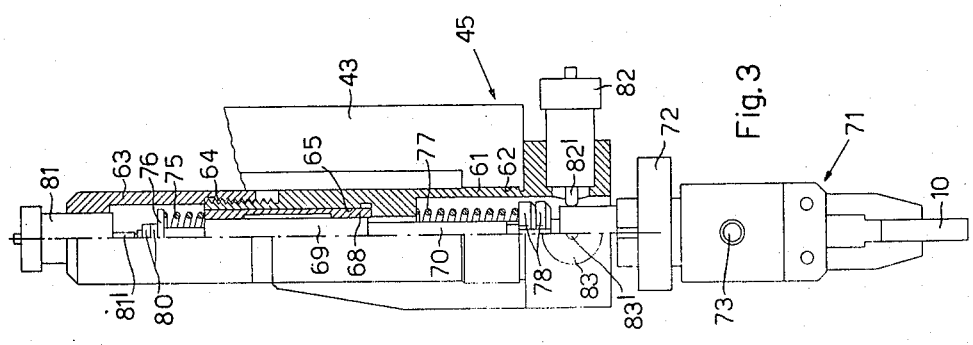
FIG. 3 is a front view of the movable element of the apparatus of the invention.

The arm 45 (FIG. 3) comprises a rigid support 61 housed in a recess 62 of the slide 43, to which it is fixed by known means not shown in the drawings. The support 61 comprises at the top a removable wall 63 connected to the support 61 by means of a thread 64. In another recess 65 of the support 61 there is housed a sleeve 68 in which a cylindrical stem 69 made of steel having suitable characteristics of flexibility or of other metal or similar material can slide in a vertical direction. The stem 69 includes a portion 70 the diameter of which is smaller than the corresponding diameter of the support 43 by an amount sufficient to allow the said portion 70 to bend by small amounts without interfering with the support 43. On the lower end of the portion 70 there are arranged pneumatic pincers 71 which clamp the part 10. The pincers 71 are fixed to the portion 70 by means of a clamp 72 and include an inlet 73 for connecting them to a source of compressed air (not shown in the drawings) adapted to operate the jaws thereof. The arm 45 may be equipped with pincers different from the pincers 71 or with tools such as screwdrivers, U bolt feeders, etc. A first spring 75 is arranged between the sleeve 68 and a stop ring 76 fixed at the upper end of the stem 69 to support the latter. A second spring 77 is arranged between the support 61 and two ring nuts 78 screwed on to the stem 69 and locked together, for opposing the axial movements of the stem 69. Since the above-mentioned force F must be detected as an absolute value, to be compared with the absolute values P and Q, the spring 75 is pre-loaded in such manner as to compensate the total weight of the stem 69, the pincers 71, the part 10, the compressed-air tubes, the spring 77 and the ring nuts 78. The pre-loading of the spring 75 is obtained by means of a paired nut and lock nut 80 screwed on to the upper end of the stem 69.

The arm 45 is provided with three transducers 81, 82 and 83 each one formed of a linear differential transformer; the three transformers comprising movable armatures 81', 82' and 83', respectively, the directions of movement of which are respectively the abovementioned directions Z, X and Y. The armature 81' of the transducer 81 engages the upper end of the stem 69, while the armatures of the transducers 82 and 83 engage the lower end of the said stem 69 radially. Each of the transducers 81, 82 and 83 is of the type adapted to supply as output an analogue signal F of a value proportional to the force which is the cause of the movement of its armature 81', 82', 83', in the corresponding direction.

Figure 4:
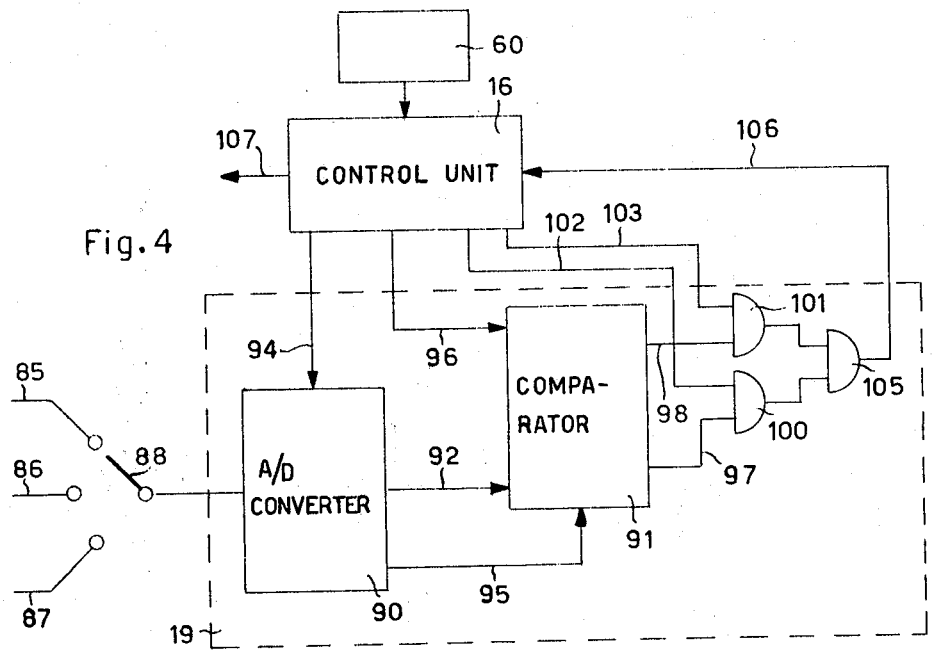
FIG. 4 is a block diagram of the control circuit of the apparatus of the invention.

The transducers 81, 82 and 83 can be connected, one at a time, to the comparator circuit 19 (FIG. 4) by means of lines 85, 86 and 87 and a switch 88 manually operable to selectively connect one of the transducers 81, 82, 83 to the circuit 19. The circuit 19 includes an analogue-to-digital converter 90 adapted to convert the analogue signal F transmitted to it by the distributor 88 into numerical form, to transmit the same to the input of a comparator 91 by means of a line 92. The converter 90 is moreover connected by means of a line 94 to the control unit 16 for the begin-conversion command, any, by means of another line 95, to the comparator 91 for sending an end-of-conversion signal thereto. The comparator 91 is adapted to compare the signal transmitted to it on the line 92 with the predetermined comparison signal P or Q transmitted to it by the control unit 16 by means of a line 96.

The output lines 97 and 98 of the comparator 91 are connected to the input of an AND circuit 100 and the input of another AND circuit 101, respectively. The other two inputs of the AND circuits 100 and 101 are connected to the control unit 16 by means of two lines 102 and 103, respectively, while the outputs of the said AND circuits 100 and 101 are input to an OR circuit 105. The output of this circuit is connected in turn, through a line 106, to the control unit 16 and the control unit is connected to the motors 41, 42 and 44 (FIG. 2) by means of a line 107 (FIG. 4), and to the tape reader 60.

As an example of operation of the apparatus of the invention, there will now be described the operation of inserting the part 10 in the hole 12 disposed in the surface 11 substantially parallel to the plane XY.

If the surface having the position to be determined lies in either the plane $yz$ or $xz$ a suitable feeler is inserted in the pincers 71 (FIG. 1) to replace the part 10 and to sense this surface. The switch 88 (FIG. 4) is accordingly switched to connect the relevant transducer 82, 83 to the circuit 19. The operation of the apparatus is then similar to that described in the case of the surface 10 in the plane $xy$.

The information necessary for performing this operation is previously stored in the control unit. More particularly, there are previously stored the ideal coordinates $x$ and $y$ of the hole 12 and the numerical value of the comparison forces P and Q.

In accordance with the principle hereinbefore stated in this description, the apparatus of the invention must guide the part 10 into the hole 12 irrespective of small errors of shape and/or position with respect to the previously stored data.

The apparatus 30 having been started, the control unit 16 actuates the motors 52 and 56 to arrange the surface 11 in the plane X Y and connects the transducer 81 to the comparator circuit 91. It then enables the motors 41 and 42 to advance the bridge 40 along the guides 37 and 38, and the slide 39 along the bridge 40, respectively, to bring the part 10 on to the vertical to the centre of the hole 11. The control unit 16 then enables the motor 44 to lower the arm 45 along the axis Z. At the same time, it sends the numerical value of the comparison force P to the comparator 91 (FIG. 4), a consent signal to the converter 90 and a signal to the AND circuit 100 by means of the line 102. When the lower end of the part 10 (FIG. 2) strikes against the surface 11, the latter transmits to the part 10 a force of which the component F along the axis Z causes the stem 69 to yield in the direction of insertion and, therefore, in this case, in the direction Z. The force F is created at the instant when the part 10 strikes against the surface 11. This striking action arrests the part 10, but the motor 44 advances the arm 45 further, as a result of which the stem 69 (FIG. 3) slides in the sleeve 68 in opposition to the spring 77. This further advance of the arm 45 causes a progressive increase in the force F, the value of which is detected instant by instant by the transducer 81 and sent as an analogue signal F to the converter 90 (FIG. 4) by means of the line 85 and the switch 88. The converter 90 converts the signal F into numerical form and transmits it to the comparator 91 through the line 92. At the end of each conversion, the converter 90 sends a signal to the comparator 91 to enable it to compare the numerical value of the force F with the numerical value of the comparison force P.

As long as F is smaller than P, the comparator 91 emits a signal on the line 98, as a result of which the AND circuits 100 and 101 do not emit any signal and the control unit 16 continues to cause the part 10 (FIG. 2) to advance. When F becomes greater than P, the comparator 91 (FIG. 4) inhibits the line 98 and emits a signal on the line 97, as a result of which the AND circuit 100 enables the OR circuit 105 to send a signal to the control unit 16. The control unit inhibits the motor 44 (FIG. 2), stopping the advance of the arm 45 on the axis Z. At this point, the control unit 16 enables the motors 41 and 42 to advance the arm 45, and therefore the part 10, along the spiral path 25 (FIG. 1) to search for the centre of the hole 12. At the same time, the control unit 16 (FIG. 4) inhibits the line 102, sends a signal to the AND circuit 101 by means of the line 103 and sends the numerical value of the comparison force Q to the comparator 91. As long as F is greater than Q, the comparator emits a signal on the line 97, as a result of which the AND circuits 100 and 101 do not emit any signal and the control unit 16 continues to cause the part 10 (FIG. 1) to advance in accordance with the spiral movement. When F becomes smaller than Q, the comparator 91 (FIG. 4) inhibits the line 97 and emits a signal on the line 98, as a result of which the AND circuit 101 enables the OR circuit 105 to send a signal to the control unit 16 which stops the motors 41 and 42 (FIG. 2). At this point, the control unit 16 enables the motor 44 again for inserting the part 10 in the hole 12.

It is necessary to note that the aforesaid impact or striking action between the part and the structure in which it is being positioned is a resilient impact, the stem 69 yielding in the direction in which the impact itself takes place.

Various modifications or additions may be made in the apparatus according to the invention without the substance thereof being changed.

The control unit and the memory may be of the most dissimilar type, according to the kind of fitting or assembly operation that the apparatus is to effect. For example, if a series of like pins is to be fitted, it is sufficient to prearrange a series of suitably timed switches as the control unit and memory. For fitting or assembly of a more sophisticated kind, the control unit may be of the type used for controlling machine tools, for example of the point-to-point type with various controlled axes.

The control unit may moreover be programmed to effect insertions into holes not parallel to the coordinated axes or even slanting holes.

In the case in which the control unit is of the type adapted to control several coordinated axes, the apparatus of the invention may comprise several comparator circuits 91 each connected to the corresponding transducer. Moreover, it may comprise several arms 45.

What I claim is:

1. Adaptive feeling apparatus for determining a prearranged position on a surface of a structure, comprising:

at least one element movable in accordance with a predetermined path recorded on an information support for sensing the surface of the structure, control means for controlling the movement of said element for advancing said movable element in a first stage to contact said surface to determine the plane in which said prearranged position is located, and for advancing said movable element in a second stage in said plane in a predetermined search movement to determine said prearranged position, the contact of said element with said surface producing a variable force on said element, means for detecting said force, and means responsive to said detecting means for causing said control means to shift from said first stage to said second stage upon a first modification of said force applied to said element to at least a first predetermined value, said causing means comprising comparison means for comparing said variable force with a first comparison force comprising said first predetermined value during said first stage and with a second predetermined value during said second stage, said second stage movement being terminated upon a second modification of said force applied to said element to at least said second predetermined value thereby defining said prearranged position.

2. Apparatus as in claim 1, comprising at least one motor for advancing the said element, the said motor being controlled by the said control means.

3. Apparatus as in claim 1, wherein the said movable element comprises at least one device for gripping a part to be transported to the said prearranged position.

4. Apparatus as in claim 1, wherein said comparison means allows the said control means to stop the first stage when the value of the said variable force equals the value of the said first comparison force and allows the said second stage to be stopped when the value of the said variable force equals the value of the said second comparison force.

5. Apparatus as in claim 4, wherein said detecting means comprise a part yielding with respect to the movable element, the displacement of the said yielding part with respect to the said movable element representing said variable force in a predetermined relation.

6. Apparatus as in claim 5, wherein the said movable element includes an arm slidable in an axial direction, the said yielding part including resilient means and a stem resiliently flexible and slidable in the said axial direction with respect to the said arm in opposition to the action of said resilient means.

7. Apparatus as in claim 6, wherein said stem comprises a part slidable in a sleeve of the said arm and another part outside the said sleeve which is free to bend radially, the said resilient means including at least one calibrated helicoidal spring disposed between the said stem and the said arm.

8. Apparatus as in claim 5, comprising means for measuring the said displacement and for transducing the value of the said displacement into a signal proportional to the said variable force for controlling the movement of said element.

9. Apparatus as in claim 8, wherein said comparison means are connected on the input side to the said measuring and transducing means to receive the said signal proportional to the said variable force, the said comparison means being moreover connected on the input side to the said control means to receive a signal proportional to the said comparison forces.

10. Apparatus as in claim 9, wherein the output of the said comparison means is connected to the said control means to transmit to the said control means a signal of equality between the said variable force and the said comparison forces.

11. Apparatus as in claim 4, wherein said comparison means comprise an analogue-to-digital converter circuit and a comparator circuit, the said converter circuit receiving as input the said signal proportional to the variable force, the said comparator receiving as input from the said converter circuit the said signal proportional to the variable force in numerical form and receiving from the sdaid control means the said signal proportional to the comparison forces expressed in numerical form, the said comparator circuit being connected on the output side to the said control means by intermediate means.

12. Apparatus as in claim 11, wherein said intermediate means include an AND circuit comprising a first AND gate and a second AND gate, the first AND gate being connected to a first output of the said comparator circuit, the said first output being adapted to emit a signal when the said variable force exceeds the said first comparison force, the second AND gate being connected to a second output of the said comparator circuit, the said second output being adapted to emit a signal when the said variable force becomes smaller than the said second comparison force, the said first AND gate being moreover connected to the said control means to be enabled during the advance of the said arm against the said surface and the said second AND gate being moreover connected to the said control means to be enabled during the advance of the said arm in the said plane.

13. Apparatus as in claim 5, wherein said movable element comprises at least one device for gripping a part to be transported to the said prearranged position, the said gripping device being secured to the said yielding part so that the said variable force is transmitted by the gripped part to the said yielding part.

14. Apparatus as in claim 13, comprising means for operating the said gripping device when the said gripped part reaches the said prearranged position, in such manner as to fit the said gripped part into the said structure.

* * * * *